Aug. 28, 1951 J. H. SCHMID ET AL 2,565,993
HYDRANT
Filed Sept. 23, 1946
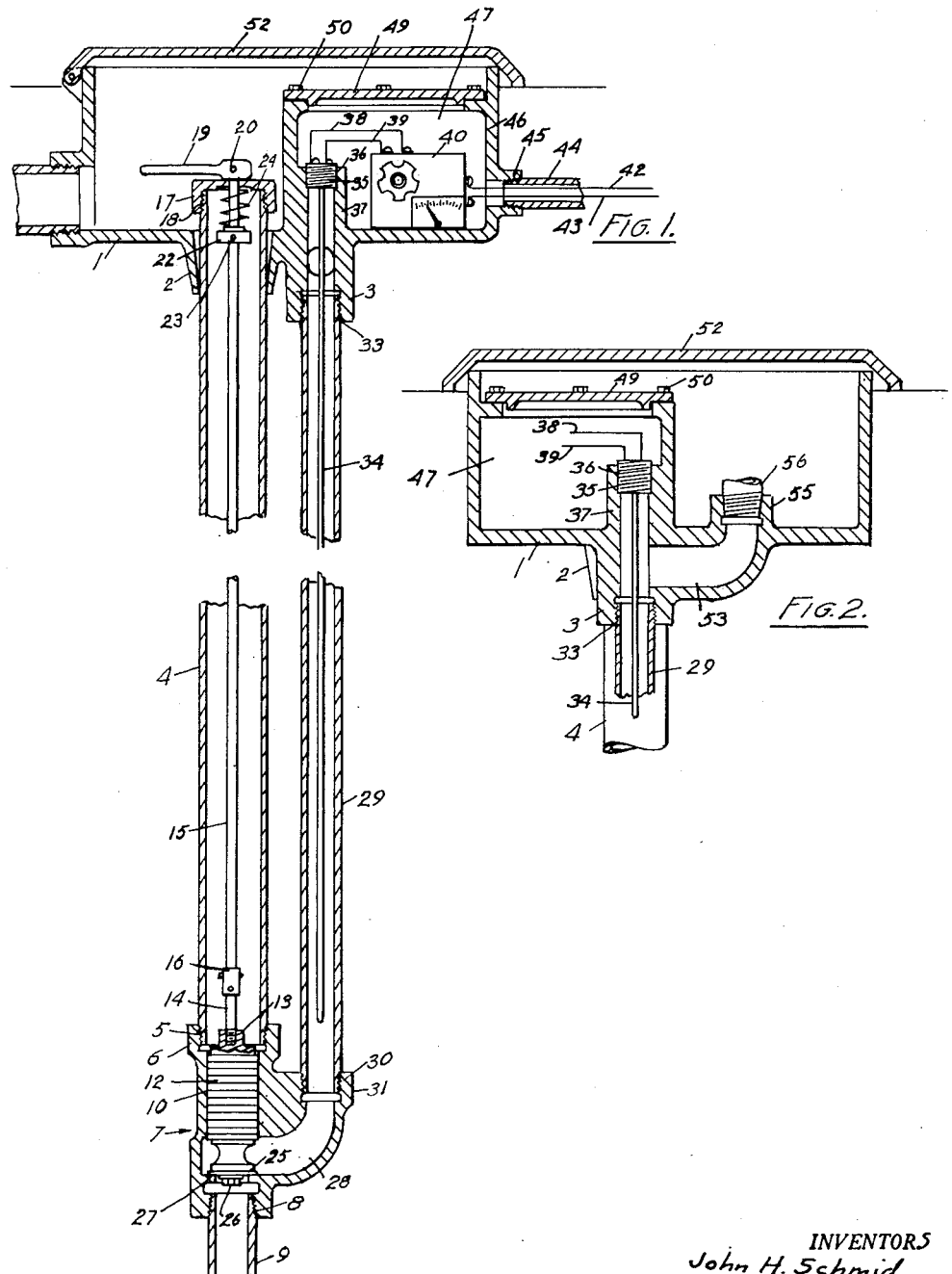
INVENTORS
John H. Schmid
John P. Tansey
BY Frank J. Seigel
Florian G. Miller
Atty.

Patented Aug. 28, 1951

2,565,993

UNITED STATES PATENT OFFICE 2,565,993

HYDRANT

John H. Schmid, Erie, John P. Tansey, Clairton, and Frank J. Seigel, Pittsburgh, Pa., assignors to J. A. Zurn Manufacturing Company, Erie, Pa., a corporation of Pennsylvania Application September 23, 1946, Serial No. 698,832

2 Claims. (Cl. 219—38)

This invention relates generally to hydrants and more particularly to hydrants of the non-freezing type.

Conventional hydrants of the non-freezing type utilize various means of draining water from the water column at or near the base thereof. These hydrants require a porous filling at the base of the hydrant, thereby requiring the valve in the hydrant to be located a greater distance below the surface of the earth in that the frost line is necessarily a greater distance from the surface of the earth. In these prior devices there has been siphonage of ground and waste water into the water column when a reduced pressure or vacuum occurs in the water column or in the hydrant supply line.

It is, accordingly, an object of my invention to overcome the above and other defects in non-freezing hydrants, and it is more particularly an object of my invention to provide a non-freezing hydrant which is simple in construction, easy to install, economical in manufacture, economical in cost and efficient in operation.

Another object of my invention is to provide a non-freezing hydrant which has no outside drain or other connections, thereby eliminating any opportunity for cross-connection between the water supply line and any ground water, sewer line, or the like.

Another object of my invention is to provide a non-freezing hydrant utilizing an electric heater.

Another object of my invention is to provide a non-freezing hydrant which minimizes the over all distance that the hydrant must be disposed in the ground because of heating means provided therefor.

Another object of my invention is to provide novel means for heating the supply line of a non-freezing hydrant.

Other objects of my invention will become evident from the following detailed description, taken in conjunction with the accompanying drawings, in which Fig. 1 is a vertical sectional view of my novel non-freezing hydrant; and Fig. 2 is a fragmentary sectional view taken on the line 2—2 of Fig. 1.

Referring now to the drawings, we show in Figs. 1 and 2 a box-like member 1 having a flanged aperture 2 and a threaded flanged aperture 3. Extending downwardly through the flanged aperture 2 of the member 1 is a valve sleeve 4 having the lower end thereof threaded at 5 for threadable engagement with a threaded hub 6 of a two-branch fitting 7. The fitting 7 has a threaded aperture 8 in the lower end thereof for threadably engaging a water supply line 9. An aperture 10 in axial alignment with the aperture 8 in the fitting 7 has disposed therein a sealing member 12 having a threaded portion 13 on the upper end thereof for threadably engaging a valve rod 14 connected to a second valve rod 15 by connecting member 16. The upper end of the valve rod 15 extends through a threaded cap member 17 threadably engaging the upper threaded portion 18 of the valve sleeve 4. A cam lever 19 is pivotally connected at 20 with the upper end of the valve rod 15 to engage the top of the cap member 17 to reciprocate the valve rods 14 and 15. A stop member 22 is disposed on the valve rod 15 by pin 23 and has a spring member 24 disposed between it and a recess 24 in the cap member 17. The lower end of the member 12 has a seating member 25 secured by a screw bolt 26 for seating on valve seat 27 in the fitting 7. Upon upward movement of the rods 14 and 15, the seating member 25 moves away from the seat 27 of the fitting 7 to permit water from the supply line 9 to pass into the lateral branch 28 of the fitting 7 and upwardly through a fluid supply line 29 which is threadably engaged at 30 to the threaded portion 31 of the fitting 7. The upper threaded portion 33 of the fluid line 29 is threadably engaged with the threaded hub 3 of the base 1. A heating rod 34 extends axially of the fluid line 29 and is connected to an insulating member 35 which threadably engages the threaded portion 36 of an inner hub 37 in the member 1. Wires 38 and 39 lead to a rheostat 40 suitably calibrated and compensated so that any desired amount of heat may be provided for the heating rod 34. The heating rod 34 may be any conventional high resistance heating element or any other suitable heating means may be utilized. Wires 42 and 43 lead outwardly from the rheostat 40 through a conduit member 44 threadably engaged to a threaded boss 45 in the side wall 46 of the member 1. A chamber 47 in which the rheostat 40 is disposed is provided in the member 1 and is covered by a cap member 49 suitably secured by screw bolts 50. The box-shaped member 1 is covered by a hinged cover 52. A laterally extending branch line 53 in the member 1 connects with the fluid line 29 and extends upwardly to a threaded boss 55 in the member 1 wherein any suitable threaded connection 56 may be made to provide a supply of fluid.

In operation, the rheostat 40 is adjusted to the desired degree of heat desired in the heating rod 34. The heating rod 34 normally extends to a point near or below the frost line of the earth so that any water therein is heated and no freezing takes place. The valve member 25 closes the water supply line 9 so that it is only necessary to heat the water in the branch line 28 of the fitting 7 and the water in the supply line 29. It will be evident that it will not be necessary in our novel device to place the valve member 25 below the frost line inasmuch as heated water in the branch 28 and surrounding the valve 25 will prevent freezing of water in supply line 29 and the formation of ice on the top of this water.

It will be evident from the foregoing description that we have provided a non-freezing hydrant which is entirely closed to entering seepage or sewer water, which is simple in construction and efficient in operation.

Various changes may be made in the specific embodiment of our present invention without departing from the spirit thereof or from the scope of the appended claims.

What we claim is:

1. A non-freezing hydrant comprising a fitting having an inlet and an outlet adapted for disposal below the surface of the earth, a valve in said fitting associated with the inlet aperture thereof to control the flow of fluid therefrom, means for operating said valve, an outlet conduit adapted to extend from the outlet of said fitting to the surface of the earth, a box-like member connected to the upper end of said outlet conduit having an apertured portion in alignment therewith, and a detachable electrical heating rod depending in said outlet conduit for heating the fluid therein having the upper end detachably connected in the aperture in said box-like member, said box-like member having an outlet aperture extending laterally of said upwardly extending aperture to provide an outlet for fluid from said conduit.

2. A non-freezing hydrant as set forth in claim 1 wherein said fitting has a vertically movable valve therein with a rod extending upwardly therefrom through an aperture in said box-like member, and means are provided on the upper end of said rod for operating said valve to control the flow of fluid through said fitting.

JOHN H. SCHMID.
JOHN P. TANSEY.
FRANK J. SEIGEL.

REFERENCES CITED

The following references are of record in the file of this patent:

UNITED STATES PATENTS

| Number | Name | Date |
|---|---|---|
| 329,881 | Benton | Nov. 10, 1885 |
| 336,253 | Moss | Feb. 16, 1886 |
| 408,646 | Arci | Aug. 6, 1889 |
| 749,628 | Peacock | Jan. 12, 1904 |
| 862,593 | Steiner | Aug. 6, 1907 |
| 1,123,418 | Steiner | Jan. 5, 1915 |
| 1,267,416 | Jacob | May 28, 1918 |
| 1,298,505 | Hollister | Mar. 25, 1919 |
| 1,359,049 | Furstenau | Nov. 16, 1920 |
| 1,611,606 | Pope | Dec. 21, 1926 |
| 1,688,108 | Berger | Oct. 16, 1928 |

FOREIGN PATENTS

| Number | Country | Date |
|---|---|---|
| 153,512 | France | of 1883 |